(12) United States Patent
Lindholm et al.

(10) Patent No.: US 9,559,501 B2
(45) Date of Patent: Jan. 31, 2017

(54) HOUSING ASSEMBLY AND METHOD OF ASSEMBLING SAME

(75) Inventors: Brian Eric Lindholm, Salem, VA (US); Ryan Richard Tenga, Christiansburg, VA (US); Yuenan Chen, Blacksburg, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 116 days.

(21) Appl. No.: 13/179,717

(22) Filed: Jul. 11, 2011

(65) Prior Publication Data

US 2013/0016456 A1 Jan. 17, 2013

(51) Int. Cl.
H02B 1/28 (2006.01)

(52) U.S. Cl.
CPC ............ H02B 1/28 (2013.01); *Y10T 29/49826* (2015.01)

(58) Field of Classification Search
USPC .......................... 361/679.01, 679.02; 174/50
See application file for complete search history.

(56) References Cited

U.S. PATENT DOCUMENTS

| | | | |
|---|---|---|---|
| 3,912,348 A | | 10/1975 | Seymour |
| 4,654,470 A | * | 3/1987 | Feldman et al. ................. 174/50 |
| 4,771,908 A | * | 9/1988 | McIntosh ....................... 220/668 |
| 5,228,762 A | * | 7/1993 | Mascrier .................... 312/265.4 |
| 5,294,748 A | * | 3/1994 | Schwenk et al. ............. 174/363 |
| 5,435,641 A | | 7/1995 | Dumon Dupuis et al. |
| 5,479,341 A | * | 12/1995 | Pihl et al. ....................... 700/79 |
| 5,639,150 A | * | 6/1997 | Anderson et al. ......... 312/265.3 |
| 5,695,263 A | * | 12/1997 | Simon et al. ............... 312/265.4 |
| 5,828,544 A | * | 10/1998 | Matsuda ....................... 361/641 |
| 5,914,460 A | | 6/1999 | Mowery et al. |
| 6,036,290 A | * | 3/2000 | Jancsek et al. ............ 312/265.4 |
| 6,039,415 A | | 3/2000 | Bruun |
| 6,104,003 A | * | 8/2000 | Jones ........................... 219/400 |
| 6,179,144 B1 | | 1/2001 | Abroy et al. |
| 6,323,418 B1 | * | 11/2001 | Tiburtius et al. ............. 174/387 |
| 6,330,152 B1 | * | 12/2001 | Vos et al. ..................... 361/688 |

(Continued)

FOREIGN PATENT DOCUMENTS

| | | |
|---|---|---|
| AU | 2009251100 A1 | 7/2010 |
| CN | 201709044 U | 1/2011 |

(Continued)

OTHER PUBLICATIONS

EP Search Report and Written Opinion dated Apr. 9, 2014 issued in connection with corresponding EP Patent Application No. 12175442.8.

(Continued)

*Primary Examiner* — Adrian S Wilson
(74) *Attorney, Agent, or Firm* — Armstrong Teasdale LLP

(57) ABSTRACT

A method of assembling a housing assembly is provided. The method includes providing a housing that includes an access panel and a cavity defined therein, wherein the housing is sized to enclose at least one electrical system within the cavity. A portion of the housing is enclosed with a cover such that the access panel remains accessible and the cover is positioned against the portion of the housing. At least one gasket is coupled between the housing and the cover such that a seal is formed on the housing assembly that substantially prevents fluid from entering the housing assembly.

15 Claims, 3 Drawing Sheets

(56) References Cited

U.S. PATENT DOCUMENTS

| | | | |
|---|---|---|---|
| 6,501,015 B2* | 12/2002 | Maloney et al. | 174/17 VA |
| 6,561,311 B2 | 5/2003 | Chuang | |
| 6,621,712 B2* | 9/2003 | Siira et al. | 361/796 |
| 6,646,864 B2* | 11/2003 | Richardson | 361/679.3 |
| 6,646,892 B1* | 11/2003 | Hsu | 361/818 |
| 6,659,274 B2* | 12/2003 | Enners | 206/305 |
| 6,695,421 B1* | 2/2004 | Frase et al. | 312/409 |
| 6,773,018 B2 | 8/2004 | Gomez | |
| 6,852,924 B2* | 2/2005 | Lessard | H05K 9/0073 174/377 |
| 7,075,005 B1* | 7/2006 | Drane | 174/50 |
| 7,157,643 B2* | 1/2007 | Drane | 174/66 |
| 7,275,770 B2* | 10/2007 | Guebre-Tsadik et al. | 292/145 |
| 7,388,164 B2* | 6/2008 | Scanzillo | 174/482 |
| 7,489,509 B2* | 2/2009 | Keenan | H05K 7/20572 312/223.1 |
| 7,795,532 B2* | 9/2010 | Walker | 174/50 |
| 7,916,487 B2* | 3/2011 | Bitton et al. | 361/724 |
| 7,957,139 B2* | 6/2011 | Davis et al. | 361/690 |
| 8,107,238 B2* | 1/2012 | Krietzman et al. | 361/690 |
| 8,395,046 B2* | 3/2013 | Nicewicz et al. | 174/50 |
| 8,454,101 B2* | 6/2013 | Kuo | 312/296 |
| 2002/0064035 A1* | 5/2002 | Mair et al. | 361/800 |
| 2002/0171340 A1* | 11/2002 | Chandler | 312/265.1 |
| 2004/0064631 A1* | 4/2004 | Kishon et al. | 711/100 |
| 2004/0070926 A1* | 4/2004 | Boykin et al. | 361/683 |
| 2004/0188120 A1* | 9/2004 | Komatsu et al. | 174/17 CT |
| 2005/0246982 A1* | 11/2005 | MacMillan et al. | 52/220.8 |
| 2005/0259383 A1* | 11/2005 | Ewing et al. | 361/622 |
| 2006/0006773 A1* | 1/2006 | Guebre-Tsadik et al. | 312/326 |
| 2006/0148398 A1* | 7/2006 | Ruch et al. | 454/184 |
| 2006/0273081 A1* | 12/2006 | Fernandez et al. | 220/3.2 |
| 2007/0049091 A1* | 3/2007 | Sato et al. | 439/276 |
| 2007/0061598 A1* | 3/2007 | Bitton et al. | 713/194 |
| 2007/0247041 A1* | 10/2007 | Hudz et al. | 312/265.4 |
| 2008/0113676 A1* | 5/2008 | Hutton et al. | 455/461 |
| 2008/0231151 A1* | 9/2008 | Barringer et al. | 312/223.2 |
| 2008/0310101 A1* | 12/2008 | Pawlenko et al. | 361/689 |
| 2009/0056248 A1* | 3/2009 | Pflum et al. | 52/220.1 |
| 2009/0091220 A1* | 4/2009 | Eyer et al. | 312/215 |
| 2009/0139887 A1* | 6/2009 | Furey et al. | 206/320 |
| 2010/0128433 A1* | 5/2010 | Harwood et al. | 361/690 |
| 2010/0208433 A1* | 8/2010 | Heimann et al. | 361/724 |
| 2010/0214732 A1* | 8/2010 | Charles et al. | 361/679.33 |
| 2011/0012489 A1* | 1/2011 | Shen et al. | 312/326 |
| 2011/0017747 A1* | 1/2011 | Wildman et al. | 220/560.01 |
| 2011/0182022 A1* | 7/2011 | Lu et al. | 361/679.33 |
| 2011/0267782 A1* | 11/2011 | Petrick et al. | 361/724 |
| 2013/0032310 A1* | 2/2013 | Jaena et al. | 165/104.25 |

FOREIGN PATENT DOCUMENTS

| | | |
|---|---|---|
| EP | 0514668 A1 | 11/1992 |
| WO | 9310691 A1 | 6/1993 |

OTHER PUBLICATIONS

Unofficial English Translation of Chinese Office Action issued in connection with corresponding CN Application No. 201210238603.6 on Dec. 22, 2015.

* cited by examiner

HOUSING ASSEMBLY AND METHOD OF ASSEMBLING SAME

BACKGROUND OF THE INVENTION

The field of the invention relates generally to industrial systems and, more particularly, to housing assemblies for use with industrial systems.

At least some known industrial systems, such as power generation systems, include various electrical systems, such as, for example, turbine control equipment, generator controls, exciter controls, and/or static starter controls. Such electrical systems generally require protection against various factors, such as dust particles and water. More specifically, contaminants, such as dust particles and/or water, may cause damage to the electrical system if such contaminants contact the system. Moreover, continued operation with such contaminants within the electrical system may lead to a premature failure of the electrical system and/or the higher-level system which the electrical system, such as the control system controls. To prevent such failures, at least some electrical systems are housed within a structure, such as a housing or a cabinet. For example, many industrial control and electronic systems are mounted inside sheet metal cabinets that have an Industrial Protection (IP) rating of 20 or 21. Specifically, a cabinet with an IP20 rating is protected against touch by a finger, but is not protected against liquids, whereas a cabinet with an IP21 rating protected against touch by a finger and is also protected against condensation. Many power generation systems require additional protection and use cabinets with an IP54 rating that also protects against dust ingress and water spray from any direction.

Many power generation facilities may require an upgrade of their IP20 and/or IP21 cabinet to a cabinet that offers better protection, such as an IP54 cabinet. However, making such an upgrade is costly, tedious, and time consuming. More specifically, as part of an upgrade process, a facility may also be forced to modify their industrial control and power electronics equipment to enable such equipment to be properly mounted within the cabinet.

BRIEF DESCRIPTION OF THE INVENTION

In one embodiment, a method of assembling a housing assembly is provided. The method includes providing a housing that includes an access panel and a cavity defined therein, wherein the housing is sized to enclose at least one electrical system within the cavity. A portion of the housing is enclosed with a cover such that the access panel remains accessible and the cover is positioned against the portion of the housing. At least one gasket is coupled between the housing and the cover such that a seal is formed on the housing assembly that substantially prevents fluid from entering the housing assembly.

In another embodiment, a housing assembly is provided. The housing assembly includes a housing that includes an access panel and a cavity defined therein, wherein the housing is sized to enclose at least one electrical system within the cavity. Moreover, the housing assembly includes a cover that is configured to enclose a portion of the housing such that the access panel remains accessible and the cover is positioned against the portion of the housing. The housing assembly also includes at least one gasket that is coupled between the housing and the cover such that a seal is formed on the housing assembly that substantially prevents fluid from entering the housing assembly.

In yet another embodiment, an industrial system is provided. The industrial system includes at least one electrical system and at least one housing assembly configured to enclose the electrical system. The housing assembly includes a housing that includes an access panel and a cavity defined therein, wherein the housing is sized to enclose the electrical system within the cavity. Moreover, the housing assembly includes a cover that is configured to enclose a portion of the housing such that the access panel remains accessible and the cover is positioned against the portion of the housing. The housing assembly further includes at least one gasket that is coupled between the housing and the cover such that a seal is formed on the housing assembly that substantially prevents fluid from entering the housing assembly.

DETAILED DESCRIPTION OF THE INVENTION

The exemplary methods, apparatus, and systems described herein overcome at least some known disadvantages associated with at least some known housing or cabinet structures used to enclose electrical systems. The embodiments described herein provide a housing assembly that includes a housing that includes an access panel and a cavity defined therein. The housing is sized to enclose at least one electrical system within the cavity. Moreover, the housing assembly also includes a cover configured to enclose a portion of the housing such that the access panel remains accessible and the cover is positioned against the housing. At least one gasket extends between the housing and the cover to prevent fluid from entering therein. Moreover, the combination of a cover and the gaskets enables the electrical system to be substantially shielded from any fluid that may cause damage. As such, there is no need to purchase a cabinet with a higher IP rating and there is no need to modify the electrical system to enable it to be mounted within a new cabinet.

Figure 1:
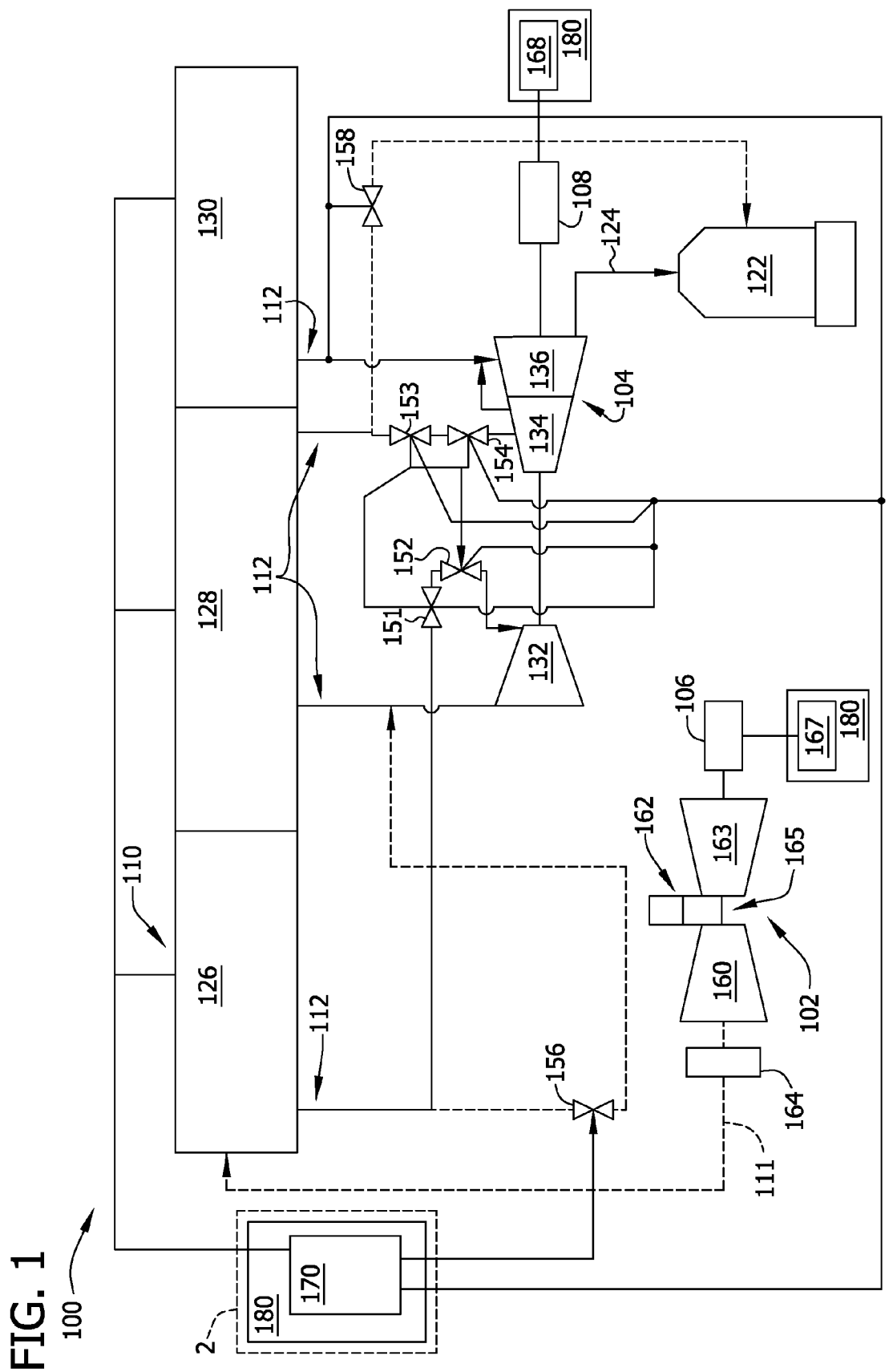
FIG. 1 is a block diagram of an exemplary industrial system.

FIG. 1 is a schematic illustration of an exemplary industrial system 100. More specifically, in the exemplary embodiment, system 100 is a combined-cycle power generation system. Although the exemplary embodiment illustrates a combined-cycle power generation system, the present invention is not limited to combined-cycle power generation systems, and one of ordinary skill in the art will appreciate that the current invention may be used in connection with any type of industrial system.

In the exemplary embodiment, system 100 includes at least one gas turbine engine 102 and at least one steam turbine engine 104 that are rotatably coupled to a first electric power generator 106 and a second electric power generator 108, respectively. System 100 also includes at least one heat recovery steam generator (HRSG) 110 coupled in flow communication with gas turbine engine 102 via an exhaust gas conduit 111. It should be noted that, as used herein, the term "couple" is not limited to a direct mechanical, communication, and/or an electrical connection between components, but may also include an indirect mechanical, communication and/or electrical connection between multiple components.

Moreover, in the exemplary embodiment, steam turbine engine 104 is coupled in flow communication with HRSG 110 via multiple steam conduits 112. Steam turbine engine 104 is also coupled in flow communication with a condenser 122 via a low pressure steam exhaust conduit 124. In the exemplary embodiment, HRSG 110 includes a high pressure (HP) superheater section 126, a reheater/intermediate pressure (RH/IP) section 128, and a low pressure (LP) section 130. Similarly, steam turbine engine 104 includes an HP section 132, an IP section 134, and a LP section 136.

In the exemplary embodiment, system 100 includes a main stop valve (MSV) 151 and a main control valve (MCV) 152 that are each coupled in flow communication with one of conduits 112 upstream from HP section 132. System 100 also includes an intermediate stop valve (ISV) 153 and an intermediate control valve (ICV) 154 that are each coupled in flow communication in a conduit 112 upstream from IP section 134. System 100 also includes an HP bypass pressure control valve (HP bypass PCV) 156 that is coupled in flow communication with a conduit 112 and an IP bypass pressure control valve (IP bypass PCV) 158 that is coupled in flow communication with a conduit 112.

Moreover, in the exemplary embodiment, gas turbine engine 102 includes, a compressor section 160, a combustor section 162 coupled downstream from compressor section 160, a turbine section 163 that is coupled downstream from combustor section 162, and an exhaust section 164. Turbine section 163 is coupled to compressor section 160 via a rotor shaft 165. Turbine section 163 is also coupled to generator 106.

Moreover, in the exemplary embodiment, system 100 includes at least one electrical system, such as an exciter 167 coupled to generator 106 and to turbine section 163, a static starter 168 coupled to generator 108, and a control system 170 coupled to HRSG 110 and coupled to MSV 151, MCV 152, ISV 153, ICV, HP bypass PCV 156, and IP bypass PCV 158. In the exemplary embodiment, control system 170 regulates steam flow and pressure within system 100 by selectively opening and closing HP bypass PCV 156, IP bypass PCV 158, MSV 151, MCV 152, ISV 153, and ICV 154 via features, such as, but not limited to, receiving permissive inputs, transmitting permissive outputs, and transmitting opening and closing commands. Alternatively, control system 170 may regulate any other parameters and/or features of system 100. Moreover, in the exemplary embodiment, exciter 167, static starter 168, and control system 170 are each enclosed within a housing assembly 180. While the exemplary embodiment illustrates housing assembly 180 enclosing exciter 167, static starter 168, and control system 170, housing assembly 180 may enclose any other electrical system that is part of industrial system 100.

During operation, air is channeled towards compressor section 160 wherein the air is compressed to a higher pressure and temperature prior to being discharged towards combustor section 162. The compressed air is mixed with fuel and ignited to generate combustion gases that are channeled towards turbine section 163. More specifically, fuel, for example, natural gas and/or fuel oil, is injected into the air flow, and the fuel-air mixture is ignited to generate high temperature combustion gases that are channeled towards turbine section 163. Turbine section 163 converts the thermal energy from the gas stream to mechanical rotational energy, as the combustion gases impart rotational energy to turbine section 163 enabling gas turbine engine 102 to generate power used to drive generator 106. Generator 106 then supplies electrical power to a power grid (not shown).

Moreover, in the exemplary embodiment, exhaust gases from gas turbine engine 102 are channeled to HRSG 110, via exhaust gas conduit 111. While the exhaust gases are being channeled to HRSG 110 or through HRSG 110, housing assembly 180 facilitates shielding exciter 167 and control system 170 from any gases that may leak from conduit 111 or from any other fluids within system 100.

When exhaust gases enter HRSG 110, the exhaust gases enable steam to be generated. More specifically, in the exemplary embodiment, HP superheater section 126 of HRSG 110 generates steam. HP bypass PCV 156 is opened and MSV 151 is closed to enable steam flow to be channeled through conduits 112 to steam turbine engine 104. Similarly, steam flow is channeled from RH/IP section 128 through conduits 112 and through IP bypass PCV 158 to steam turbine engine 104. Control system 170 regulates steam flow and pressure within system 100 by selectively opening and closing features of HP bypass PCV 156, IP bypass PCV 158, MSV 151, MCV 152, ISV 153, and/or ICV 154 via features that may include, without limitation, receiving permissive inputs, transmitting permissive outputs, and transmitting opening and closing commands. Housing 180 facilitates shielding control system 170, exciter 167, and static starter 168 from any steam and/or any other fluid that may leak from conduits 112 or from any part of system 100.

Steam that is channeled to steam turbine engine 104 enables steam turbine engine 104 to rotate and generate power. More specifically, power generated by steam turbine engine 104 drives generator 108 such that electrical power is transmitted to the power grid.

Figure 2:
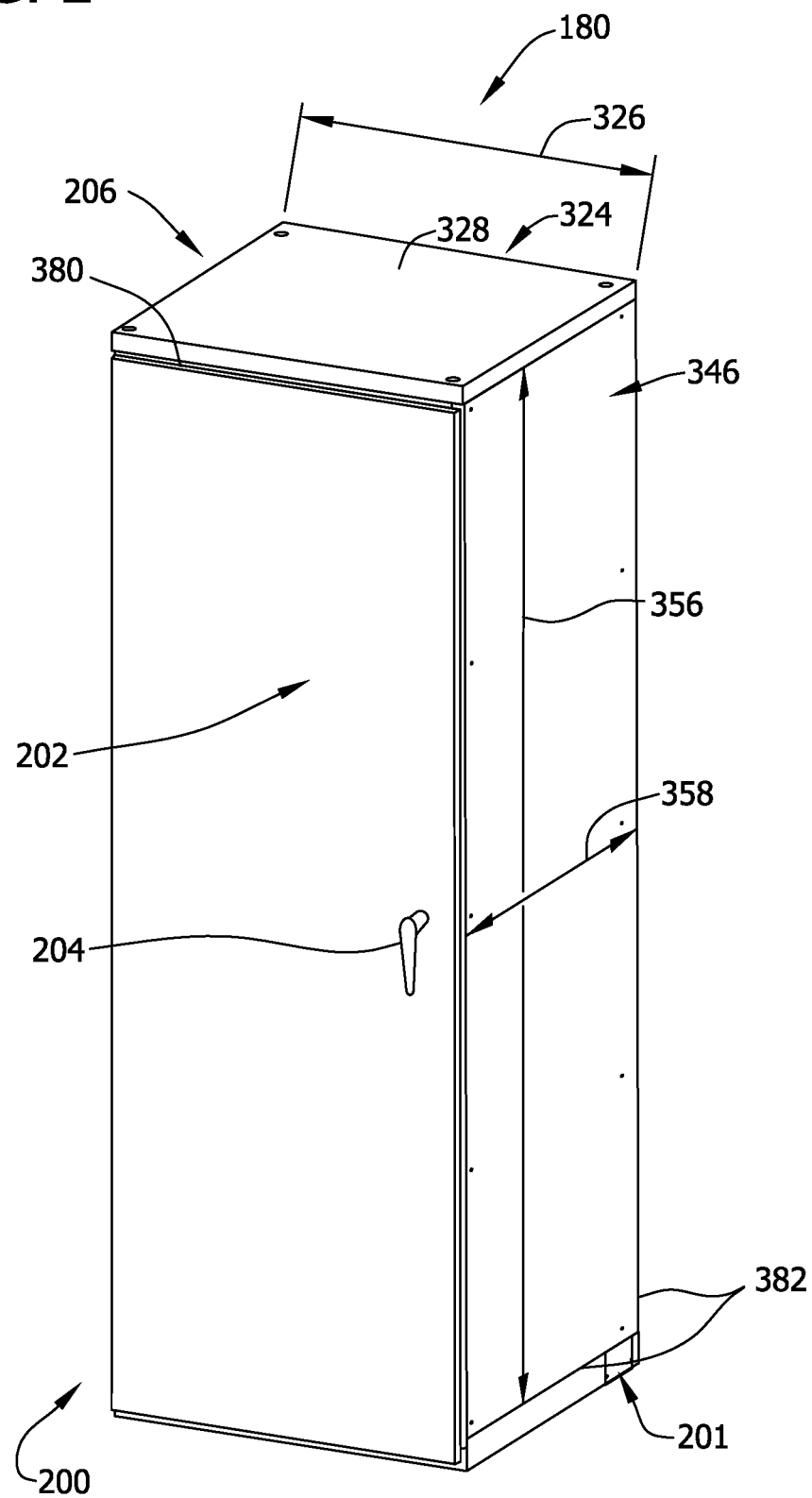
FIG. 2 is an enlarged perspective schematic view of an exemplary housing assembly that may be used with the industrial system shown in FIG. 1 and taken along area 2.
Figure 3:
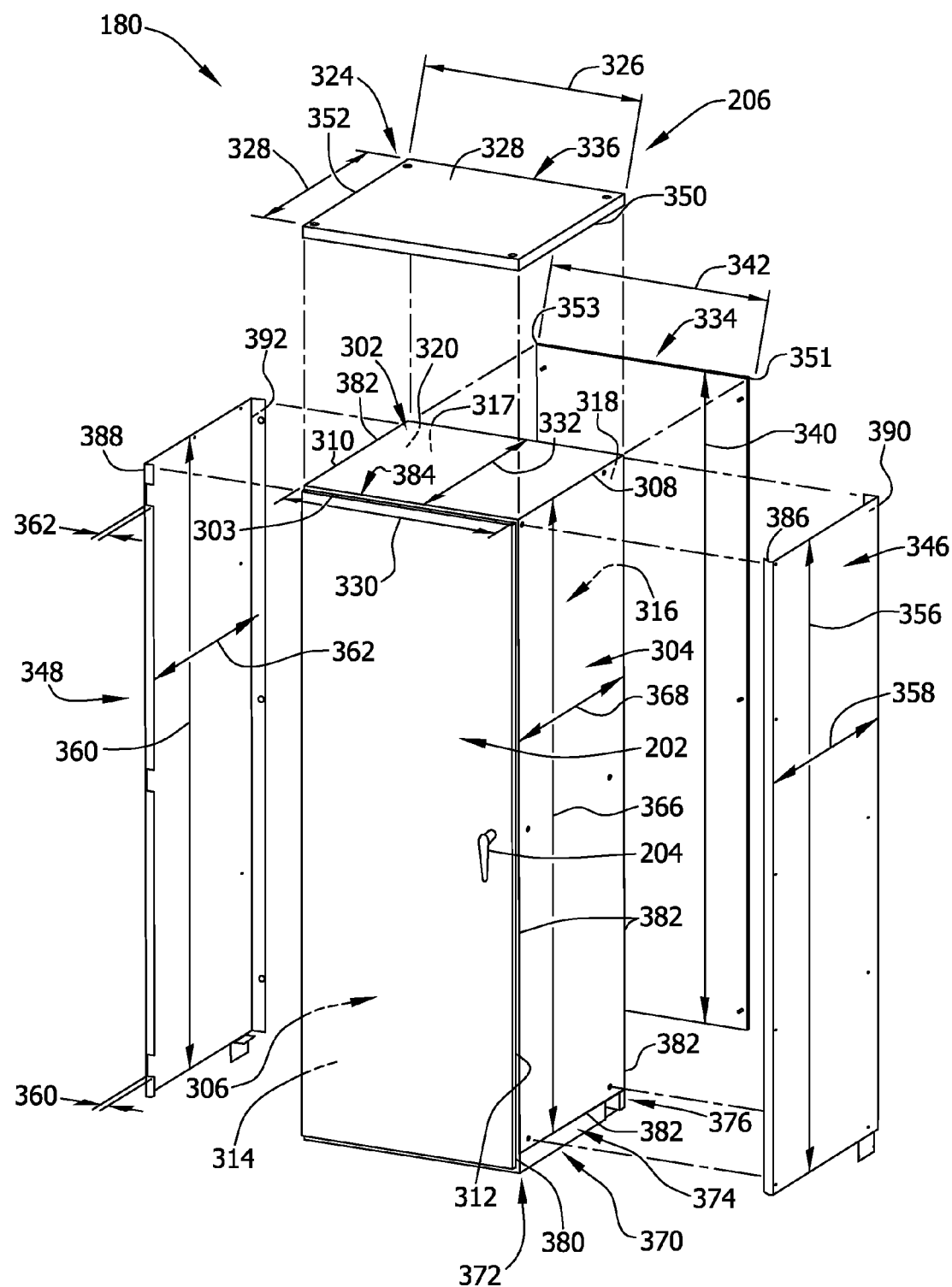
FIG. 3 is a partially exploded schematic view of the housing assembly shown in FIG. 2.

FIG. 2 illustrates an enlarged schematic perspective view of housing assembly 180 taken along area 2 (shown in FIG. 1). FIG. 3 is a partially exploded view of housing assembly 180. In the exemplary embodiment, housing assembly 180 includes a housing 200, such as an existing housing, that defines a cavity 201 therein. In the exemplary embodiment, housing 200 is sized to enclose control system 170 (shown in FIG. 1) within cavity 201. Moreover, in the exemplary embodiment, housing 200 has a substantially three-dimensional rectangular shape and is an IP21 cabinet. Alternatively, housing 200 may have any other shape and be any other type of cabinet that enables assembly 180 and/or industrial system 100 (shown in FIG. 1) to function as described herein.

Moreover, in the exemplary embodiment, housing 200 includes an access panel 202. In the exemplary embodiment, access panel 202 may be a door that includes a handle or panel knob 204 that enables a user to selectively open and close access panel 202. Moreover, in the exemplary embodiment, panel 202 may be locked to prevent unauthorized individuals from gaining access into housing 200 through panel 202. Housing assembly 180 also includes a cover 206 that encloses a portion of housing 200 such that access panel 202 remains accessible and cover 206 is positioned against portion of housing 200. Moreover, in the exemplary embodiment, cover 206 is fabricated from carbon steel. Alternatively, cover 206 may be fabricated from any other type of material that enables assembly 180 and/or system 100 to function as described herein.

Moreover, in the exemplary embodiment, housing 200 includes a top portion 302 that is coupled to access panel 202. More specifically, access panel 202 is coupled to a first edge 303 of top portion 302 when access panel 202 is in a closed position. Moreover, housing 200 includes a first sidewall 304 and a second sidewall 306. In the exemplary embodiment, each sidewall 304 and 306 is coupled to top portion 302 and access panel 202. More specifically, sidewall 304 is coupled to a second edge 308 of top portion 302, and sidewall 306 is coupled to a third edge 310 of top portion 302. Moreover, in the exemplary embodiment, sidewall 304 is coupled to a first edge 312 of access panel 202 when access panel 202 is in a closed position, and sidewall 306 is coupled to a second edge 314 of access panel 202 via at least one hinge (not shown).

Housing 200 may also include a base portion 370 that is coupled to each sidewall 304 and 306. More specifically, bottom edge (not shown) of sidewall 306 is coupled to a first edge (not shown) of base portion 370 and bottom edge 372 of sidewall 304 is coupled to second edge 374 of base portion 370.

In the exemplary embodiment, housing 200 also includes a rear portion 316 that is coupled to a rear edge 317 of top portion 302 and to a rear edge 376 of base portion 370, while first sidewall 304 is coupled to a first edge 318 of rear portion 316 and second sidewall 306 is coupled to a second edge 320 of rear portion 316. Moreover, in the exemplary embodiment, access panel 202, top portion 302, first sidewall 304, second sidewall 306, and rear portion 316 are each substantially rectangular. Alternatively, access panel 202, top portion 302, first sidewall 304, second sidewall 306, and rear portion 316 may have any other shape that enables assembly 180 and/or system 100 to function as described herein.

In the exemplary embodiment, cover 206 includes a first portion 324 that is positioned against housing top portion 302. Moreover, in the exemplary embodiment, a length 326 and a width 328 of first portion 324 are each slightly longer than a length 330 and a width 332 of housing top portion 302 such that when first portion 324 is positioned against housing top portion 302, first portion 324 substantially conceals housing top portion 302.

Cover 206 also includes a second portion 334 that is coupled to first portion 324. More specifically, in the exemplary embodiment, second portion 334 is coupled to a rear edge 336 of first portion 324. Moreover, in the exemplary embodiment, second portion 334 is positioned against housing rear portion 316. Further, in the exemplary embodiment, a length 340 and a width 342 of second portion 334 are slightly longer than a length (not shown) and a width (not shown) of housing rear portion 316 such that when second portion 334 is positioned against housing rear portion 316, second portion 334 substantially conceals housing rear portion 316.

In the exemplary embodiment, cover 206 also includes at least one side portion, such as a first side portion 346 and a second side portion 348 that are each coupled to first portion 324 and second portion 334. More specifically, in the exemplary embodiment, side portion 346 is coupled to a first edge 350 of first portion 324 and a first edge 351 of second portion 334. Side portion 348 is coupled to a second edge 352 of first portion 324 and to a second edge 353 of second portion 334. Moreover, in the exemplary embodiment, a length 356 and a width 358 for first side portion 346 are approximately equal to a length 360 and a width 362 for second side portion 348.

Moreover, in the exemplary embodiment, first side portion 346 is positioned against first sidewall 304 and second side portion 348 is positioned against second sidewall 306. Further, in the exemplary embodiment, length 356 and width 358 for first side portion 346 are each slightly longer than a length 366 and a width 368 for first side wall 304, respectively, such that when first side portion 346 is positioned against first sidewall 304, first side portion 346 substantially conceals first sidewall 304. Similarly, length 360 and width 362 for second side portion 348 are each slightly longer than a length (not shown) and a width (not shown), respectively, of second sidewall 306 such that when second side portion 348 is positioned against second sidewall 306, second side portion 348 substantially conceals second sidewall 306. Moreover, in the exemplary embodiment, first portion 324, second portion 334, first side portion 346, and second side portion 348 are each substantially rectangular. Alternatively, first portion 324, second portion 334, first side portion 346, and second side portion 348 may have any other shape that enables assembly 180 and/or system 100 to function as described herein.

Moreover, in the exemplary embodiment, at least one gasket, such as a first gasket 380 and a second gasket 382 are each coupled between housing 200 and cover 206 to form a seal on housing assembly 180 that substantially prevents fluid from entering housing assembly 180. More specifically, in the exemplary embodiment, first gasket 380 is coupled between housing 200 and cover such that first gasket 380 extends between access panel 202 and a front edge 384 of first portion 324, and extends between access panel 202 and a front edge 386 of side portion 346. In the exemplary embodiment, first gasket 380 also extends between a front edge 388 of side portion 348. In the exemplary embodiment, second gasket 382 is coupled between housing 200 and cover 206 such that second gasket 382 extends between second portion 334 and side portions 346 and 348. More specifically, in the exemplary embodiment second gasket 382 extends between second portion first edge 351 and a rear edge 390 of side portion 346. Second gasket 382 also extends between second portion second edge 353 and a rear edge 392 of side portion 348.

During operation, while exhaust gases are channeled from gas turbine engine 102 (shown in FIG. 1) to HRSG 110 (shown in FIG. 1) and while steam is channeled from HRSG 110 to steam turbine engine 104 (shown in FIG. 1), housing assembly 180 substantially shields control system 170 from any gases, steam, or any other fluids that may leak and/or be present within system 100. Because cover 206 encloses a portion of housing 200, and because gaskets 380 and 382 are between cover 206 and housing 200, fluid is substantially prevented from entering housing assembly 180 and/or contaminating control system 170. More specifically, in the exemplary embodiment, because cover first portion 324 is positioned against housing top portion 302, housing top portion 302 is concealed such that fluid may not flow within housing top portion 302. Similarly, because cover second portion 334 is positioned against housing rear portion 316, housing rear portion 316 is substantially concealed such that fluid may not flow within housing rear portion 316. Moreover, in the exemplary embodiment, first side portion 346 is positioned against sidewall 304 such that sidewall 304 is substantially concealed and fluid is prevented from flowing within sidewall 304. Similarly, second side portion 348 is positioned against sidewall 306 such that sidewall 306 is substantially concealed and fluid is prevented from flowing within sidewall 306.

Moreover, by having first gasket 380 extend between access panel 202 and cover 206, a seal is formed between housing 200 and cover 206 such that fluid is prevented from entering housing assembly 180. Similarly, by having second gasket 382 be coupled between housing 200 and cover 206 such that second gasket 382 extends between second portion 334 and side portions 346 and 348, a seal is formed between second gasket 382 and second portion 334 and side portions 346 and 348 such that fluid is prevented from entering housing assembly 180.

As compared to known industrial systems, the embodiments described herein facilitate protecting an electrical system without purchasing a cabinet with a higher IP rating and without a need to modify the electrical system such that the electrical system may be mounted within the cabinet. The embodiments described herein provide a housing assembly that includes a housing that includes an access panel and a cavity defined therein. The housing is sized to enclose at least one electrical system within the cavity. Moreover, the housing assembly also includes a cover configured to enclose a portion of the housing such that the access panel remains accessible. At least one gasket extends between the housing and the cover to prevent fluid from entering therein. Moreover, the combination of a cover and the gaskets facilitates shielding the electrical system from being exposed to any fluid that may cause damage.

Exemplary embodiments of the apparatus, system, and method are described above in detail. The apparatus, system, and method are not limited to the specific embodiments described herein, but rather, components of the system and/or steps of the method may be utilized independently and separately from other components and/or steps described herein. For example, the apparatus may also be used in combination with other systems and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a housing assembly, said method comprising:
    providing a housing that includes an access panel, at least one sidewall, a rear panel, a top panel, a bottom panel, and a cavity defined entirely therein; and
    coupling a separate cover directly against at least one of said at least one sidewall, said rear panel, and said top panel of the housing, comprising:
        enclosing a portion of the housing with the cover such that the access panel remains accessible, comprising:
            positioning a first portion of the cover against the housing top panel;
            positioning a second portion of the cover against the housing rear panel, wherein the second portion is coupled to the first portion; and
            positioning at least one side portion of the cover against the at least one sidewall of the housing such that the at least one side portion is coupled to the first portion and to the second portion;
    coupling a first gasket between the access panel and the first portion of the cover and between the access panel and the at least one side portion of the cover; and
    coupling a second gasket between the second portion and the at least one side portion of the cover such that a seal is formed on the housing assembly that substantially prevents fluid from entering the housing assembly.

2. A method in accordance with claim 1, wherein providing a housing further comprises:
    coupling the top panel to the access panel;
    coupling the at least one sidewall to the top panel and to the access panel;
    coupling the rear panel to the at least one sidewall and to the top panel; and
    coupling the bottom panel to the at least one sidewall and to the rear panel.

3. A method in accordance with claim 2, further comprising:
    concealing the housing top panel with the first portion of the cover;
    concealing the housing rear panel with the second portion of the cover; and
    concealing the at least one sidewall of the housing with the at least one side portion of the cover.

4. A method in accordance with claim 1, wherein enclosing a portion of the housing with the cover further comprises enclosing the portion of the housing with a cover fabricated from carbon steel.

5. A housing assembly comprising:
    a housing comprising an access panel, at least one sidewall, a rear panel, a top panel, a bottom panel, and a cavity defined entirely therein, wherein said housing is sized to enclose at least one electrical system within said cavity;
    a cover coupled directly against a portion of the housing such that said access panel remains accessible, wherein said cover comprises:
        a first portion positioned against said housing top panel;
        a second portion coupled to said first portion and positioned against said housing rear panel; and
        at least one side portion coupled to said first portion and to said second portion, wherein said at least one side portion is positioned against said at least one sidewall panel;
    a first gasket extending between said access panel and said first portion and between said access panel and said at least one side portion; and
    a second gasket extending between said second portion and said at least one side portion such that a seal is formed on said housing assembly that substantially prevents fluid from entering said housing assembly.

6. A housing assembly in accordance with claim 5, wherein said top panel is coupled to said access panel; said at least one sidewall is coupled to said top panel and to said access panel; said rear panel is coupled to said at least one sidewall and to said top panel; and said base panel is coupled to said at least one sidewall and to said rear panel.

7. A housing assembly in accordance with claim 5, wherein said first portion conceals said housing top panel, said second portion conceals said housing rear panel, and said at least one side portion conceals said at least one sidewall.

8. A housing assembly in accordance with claim 1, wherein said at least one sidewall comprises a first sidewall and a second sidewall, said at least one side portion comprises a first side portion positioned against said first sidewall and a second side portion positioned against said second sidewall.

9. A housing assembly in accordance with claim 8, wherein said first side portion comprises a length and a width that are substantially equal to a length and a width of said second side portion.

10. A housing assembly in accordance with claim 9, wherein said first side portion is coupled to a first edge of said first portion and to a first edge of said second portion, said second side portion is coupled to a second edge of said first portion and to a second edge of said second portion.

11. An industrial system comprising:
at least one electrical system; and
at least one housing assembly enclosing said at least one electrical system, said at least one housing assembly comprising:
a housing comprising an access panel, at least one sidewall, a rear panel, a top panel, a bottom panel, and a cavity defined entirely therein, wherein said housing is sized to enclose said at least one electrical system within said cavity;
a cover coupled directly against at least one of said at least one sidewall, said rear panel, and said top panel of said housing such that said access panel remains accessible, wherein said cover comprises:
a first portion positioned against said housing top panel;
a second portion coupled to said first portion and positioned against said housing rear panel; and
at least one side portion coupled to said first portion and to said second portion, wherein said at least one side portion is positioned against said at least one sidewall panel;
a first gasket extending between said access panel and said first portion and between said access panel and said at least one side portion; and
a second gasket extending between said second portion and said at least one side portion such that a seal is formed on said housing assembly that substantially prevents fluid from entering said housing assembly.

12. An industrial system in accordance with claim 11, wherein said top panel is coupled to said access panel; said at least one sidewall is coupled to said housing top panel; said rear panel is coupled to said at least one sidewall and to said housing top panel; and said base panel is coupled to said at least one sidewall and to said rear panel.

13. An industrial system in accordance with claim 12, wherein said first portion conceals said housing top panel, said second portion conceals said housing rear panel, and said at least one side portion conceals said at least one sidewall.

14. An industrial system in accordance with claim 12, wherein said at least one sidewall comprises a first sidewall and a second sidewall, said at least one side portion comprises a first side portion positioned against said first sidewall and a second side portion positioned against said second sidewall.

15. A method in accordance with claim 1, wherein coupling a first gasket between the access panel and the first portion of the cover and between the access panel and the at least one side portion of the cover comprises coupling a first gasket between the access panel and the first portion of the cover and between the access panel and the at least one side portion of the cover, the first gasket extending between the access panel and a front edge of the first portion of the cover.

* * * * *